United States Patent [19]

Kaplow et al.

[11] 3,753,734

[45] Aug. 21, 1973

[54] SHELF STABLE PANCAKE AND WAFFLE PRODUCTS

[75] Inventors: Milton Kaplow, White Plains; Robert E. Klose, Bronx, both of N.Y.

[73] Assignee: General Foods Corporation, White Plains, N.Y.

[22] Filed: Nov. 4, 1971

[21] Appl. No.: 195,870

Related U.S. Application Data

[63] Continuation of Ser. No. 813,321, April 3, 1969, abandoned.

[52] U.S. Cl....................... 99/92, 99/150 R, 99/189
[51] Int. Cl...... A21d 13/08, A23l 3/34, A21d 15/00
[58] Field of Search.............. 99/86, 92, 172, 150 R, 99/189

[56] References Cited
UNITED STATES PATENTS

| | | | |
|---|---|---|---|
| 3,294,547 | 12/1966 | Kooistra | 99/92 |
| 3,021,220 | 2/1962 | Going et al. | 99/92 |

*Primary Examiner*—Raymond N. Jones
*Assistant Examiner*—James Robert Hoffman
*Attorney*—Bruno P. Struzzi

[57] ABSTRACT

Shelf-stable pancake batters and pancakes which may be stored for long periods of time without refrigeration in non-hermetic packages are prepared by including in the batter water soluble solids at least equal to the moisture in the batter with edible polyhydric alcohols constituting the principal source of the water soluble solids.

4 Claims, No Drawings

SHELF STABLE PANCAKE AND WAFFLE PRODUCTS

This is a continuation of application Ser. No. 813,321, filed Apr. 3, 1969 and now abandoned.

SUMMARY

This invention relates to pancake and waffle products which are shelf stable against microorganic decomposition, to the extent that the necessity of further treatments to provide bacteriostasis and protection against development of molds is avoided. The invention further relates to new and improved processes for preparing pancake and waffle products complete in flavor, texture and appearance as compared to freshly prepared pancakes and waffles and which require neither refrigeration nor sterilization in order to impart stability against spoilage to the products.

The invention relates even further to shelf stable batters capable of being dispensed from aerosol cans onto a griddle.

The concept of intermediate moisture food products, that is, products having a moisture content in excess of 10 percent and substantially below 75 percent is set forth in U.S. Pat. No. 3,202,514. In general, an increase in the moisture level of many foods will increase the palatability thereof, however, any significant elevation of the moisture level of such foods above 10 percent leads to microbiological decomposition unless such foods are packaged in a hermetically sealed container and commercially sterilized or maintained in a frozen or refrigerated state throughout the period of distribution and storage by the consumer. These packaging and preservation methods are expensive and not convenient to the consumer under all anticipated conditions of use.

It is an object of this invention to provide moist fully cooked pancakes and waffles, complete in flavor, texture and appearance as freshly prepared pancakes and waffles, and having a high degree of palatability such that the consumer receives them favorably.

A further object of this invention is to provide moist fully cooked pancakes and waffles, complete in flavor, texture and appearance as freshly prepared pancakes and waffles, and having microbiological stability such that they can be packaged using conventional moisture protective wrapping materials while eliminating the necessity for hot packing or thermal sterilization incident to packaging and can be stored for extended periods of time under non-refrigerated conditions without incurring any significant risk of microbiological spoilage, of recontamination or of product discoloration; having the property of lending themselves to simple processing under ambient temperatures without the necessity for packaging in such a manner as to prevent occlusion of air and assuring intimate contact of the products with the packaging material.

A still further object of this invention is to provide new and improved processes of preparing pancake and waffle products in such a manner that neither refrigeration nor sterilization is required in order to impart stability against spoilage to the products.

A further object even still is to provide shelf stable batters which are capable of being dispensed from aerosol cans onto a griddle.

The term "pancake" and "waffle" as it is employed in the present context is to be understood as meaning any kind or type of batter or cooked product thereof which contains a major portion of wheat flour, bleached and/or unbleached, a minor portion of corn flour and a leavening agent.

In general, the shelf stable pancake and waffle products of this invention are formulated by preparing a batter containing egg, polyhydric alcohols, edible oils or shortening to a pancake mix, to which milk has been added, and cooking the pancake batter on a griddle to a dark brown color. The product is then allowed to cool to room temperature and is then packaged.

The batter employed to produce the shelf stable pancakes and waffles of this invention is formulated on the principles of Aw, that is, the ability of the soluble solids of the batter to limit the amount of "free" water available to bacteria; the bacteria's inability to survive this condition; and the subsequent shelf stability or product stability obtained by virtue of this condition.

An Aw value is a direct measure of water vapor which is a function of unbound water. It is determined by dividing the moles of water plus moles of soluble solids into the moles of water. The lower the Aw value, the more stable the pancake and waffle products against microbiological decomposition, e.g., 0.80 in a product indicates more stability than 0.90 in a similar type product. Some of the ingredients employed in the Aw emulsion of this invention cannot be directly calculated for their effects on Aw because of the unknown quantities of soluble solids which they contain. Therefore, samples of pancakes and waffles measured electronically for Aw are usually found to have somewhat lower Aw values as compared to those calculated directly.

To compute the complete Aw, the Aw lowering of the calculated ingredients are added together and subtracted from "1," "1" being equivalent to 100 percent water vapor or maximum water vapor which would be produced if none of the free water were bound by soluble solids. Thus a calculated Aw of 0.96 indicates an Aw lowering of 0.04.

The relative weight percent of water soluble solids to the moisture content of the pancake and waffle products, when initially incorporated into the products during their manufacture and preparatory to packaging determines the ultimate functionality of the solids in providing the requisite bacteriostatic effect. Usually the level of moisture will range from 14 percent to 40 percent. The level of water soluble solids may be varied as may the level of moisture initially incorporated within the desired ranges. However, in varying these levels the relationship of the water soluble solids in solution to the water should be controlled so as to afford the desired osmotic pressure. A good rule to observe in this connection is to be sure that the water soluble solids available for solution are at least equal to the weight of moisture present, although in some cases it is possible that a lower level of water soluble solids might afford some protection against microbiological decomposition provided an equivalent degree of osmotic pressure in available to protect the product. It will be found, however, that the water soluble solids in the present invention will constitute a major percent by weight of the pancake and waffle products.

The novel pancake and waffle products of this invention, when prepared in the manner disclosed, are characterized by their substantially complete resistance to bacterial decomposition, when the level of moisture in the batter and cooked products range from 14 percent to 40 percent, and the Aw ranges from about 0.80 to 0.90 for the batter, and about 0.65 to 0.75 for the cooked product; however, as a precautionary measure against the growth of yeast and molds certain antimycotic agents are incorporated in the batter at sufficient levels to prevent the growth of such organisms. Sorbate salts such as potassium sorbate as well as sorbic acid can be used either separately or in combination. Propylene glycol which may be used alone or with other humectants like sorbitol to impart a degree of product softness or tenderness has also been found to serve as an antimycotic. Other antimycotic agents will be apparent to those skilled in the art. The amount of antimycotic agent added is selected so as to produce the desired results and will constitute a minor porportion of the product, say from about 0.1 percent to about 2.5 percent of the total weight, depending on the particular antimycotic and the particular product composition, although even lower levels in the order of 50 p.p.m. can be employed in the case of some antimycotics such as pimaricin. Potassium sorbate in a water solution can be sprayed into the surface of the pancake or waffle product, or the product can be dipped in this solution; other antimycotics lend themselves to such surface application as esters of the parabens (para-hydroxy benzoate) such as propyl and methyl parabens (methylparahydroxy benzoate). Cellophane and other enwrapments for the food can be spray-coated with a sorbic acid solution but impregnation or dusting with sorbic acid or potassium sorbate is preferred. Antimycotics which can generally be used are benzoic acid, sodium benzoates, propionic acid, sodium and calcium propionate, sorbic acid, potassium and calcium sorbate, propylene glycol, diethyl pyrocarbonate, menadione sodium bisulfite.

The shelf stable pancake or waffle product which has been developed has an appearance, texture, color and aroma not unlike conventional pancakes and waffles. The product can be packaged using a non-hermetic packaging material such as cellophane. When removed from its pouch, the moist and soft product may be warmed just prior to consumption using a toaster or grill. The product has sufficient cohesive strength so that when it is removed from the toaster or grill, it will not tear, nor adhere to the toaster or grill. The dry ingredients chosen to produce the balanced shelf stable pancake or waffle product will include pancake mix and preferably potassium sorbate. Non-dry ingredients employed to prepare the shelf stable pancake or waffle product may include syrups, edible food oils or shortening, edible polyhydric alcohols, milk and egg.

Edible polyhydric alcohols constitute the principal source of water soluble solids of the Aw emulsion and may range from about 20 to 35 percent of the batter depending upon the particular polyhydric alcohol or polyhydric alcohol mixture, to provide the desired bacteriostatic protection. As the moisture content of the product increases in the intermediate moisture range, the level of a given edible polyhydric alcohol will correspondingly increase in order to maintain a sufficient bacteriostatic effect. The quantity of edible polyhydric alcohols chosen will vary depending upon the presence and level of auxiliary soluble solids which produce a similar increase in osmotic pressure to the batter. Thus a variety of low molecular weight polyhydric alcohols having two or more hydroxyl groups, including glycerol, sorbitol, propylene glycol, mannitol, mixtures thereof and the like may be employed. The polyhydric alcohols further assist in depleting the moisture of the pancake and waffle products by substituting for a portion of the moisture present in the interior of the product and causing moisture transfer to the exterior thereof.

Edible oils or shortenings which may be used in this invention are the hydrogenated and non-hydrogenated forms of coconut oil, palm kernel oil, cottonseed oil, corn oil, peanut oil, olive oil, sunflower oil, sesame seed oil, safflower oil, poppyseed oil, mixtures thereof, and the like. Butter and margarine may also be employed if desired.

In general the shelf stable pancake and/or waffle product of this invention is formulated by blending milk and an edible polyhydric alcohol into pancake or waffle mix, adding eggs, shortening and an antimycotic to said mix to form a shelf stable batter, and cooking the batter on a griddle. If desired, syrup may be added along with the edible polyhydric alcohol and milk.

Following are examples setting forth certain preferred but non-limiting formulations which embody the principles of the invention:

EXAMPLE I

| Ingredients | Parts by weight | % |
|---|---|---|
| Pancake Mix* | 140.0 | 29.4 |
| Milk | 120.0 | 25.3 |
| Glycerol | 140.0 | 29.4 |
| Egg | 60.0 | 12.6 |
| Cottonseed Oil | 5.0 | 1.1 |
| Propylene Glycol | 9.0 | 1.9 |
| Potassium Sorbate | 1.5 | 0.3 |
|  | 475.5 | 100.0 |

*Pancake Mix

| Ingredients | % |
|---|---|
| Wheat Flour (Bleached) | 43.0 |
| Wheat Flour (Unbleached) | 20.0 |
| Corn Flour | 16.0 |
| Sucrose | 5.6 |
| Rice Flour | 5.0 |
| Dextrose | 4.0 |
| Salt | 2.4 |
| Sodium Bicarbonate | 2.0 |
| Sodium Aluminum Phosphate | 2.0 |
|  | 100.0 |

Milk and glycerol were added to pancake mix in a Mixmaster bowl and blended for two minutes at medium speed. Next, egg, cottonseed oil, propylene glycol and potassium sorbate were added and the mixture was mixed at high speed for two minutes to form a homogeneous batter. The batter having a moisture level of 14 percent to 40 percent was then cooked on a griddle at about 375°F to form a dark brown product having the texture and appearance of conventional pancake products. The Aw of the batter was about 0.83, and the Aw of the cooked pancake product was about 0.74.

Microbiological evaluation of the batter and the cooked pancake product of example I disclosed a standard plate count, mold count and yeast count of less than 10 when tested after four weeks storage in a non-hermetic package at 100°F. The test for salmonella under these conditions disclosed none present.

Example II

| Ingredients | Parts by weight | % |
|---|---|---|
| Pancake Mix | 140.0 | 28.8 |
| Milk | 100.0 | 20.6 |
| Glycerol | 120.0 | 24.7 |
| Egg | 60.0 | 12.4 |
| Cottonseed oil | 5.0 | 1.0 |
| Propylene Glycol | 9.0 | 1.9 |
| Syrup* | 50.0 | 10.3 |
| Potassium Sorbate | 1.5 | 0.3 |

485.5   100.0

*Syrup

| Ingredients | % |
|---|---|
| Sucrose Solids | 54.25 |
| Maple Sugar Solids | 6.96 |
| 43° Be Corn Syrup | 5.00 |
| Sodium Benzoate | 0.05 |
| Sorbic Acid | 0.03 |
| Caramel Solids | 0.01 |
| Water | 33.70 |
|  | 100.00 |

Example II was prepared as in Example I, except that the syrup was added along the milk and glycerol. Microbiological tests employed in Example I were repeated here and the results were substantially the same.

Example III

| Ingredients | Parts by weight | % |
|---|---|---|
| Pancake Mix | 280.0 | 29.4 |
| Milk | 200.0 | 21.0 |
| Glycerol | 320.0 | 33.6 |
| Egg | 120.0 | 12.6 |
| Cottonseed Oil | 10.0 | 1.0 |
| Propylene Glycol | 20.0 | 2.1 |
| Potassium Sorbate | 3.0 | 0.3 |
|  | 953.0 | 100.0 |

Example II was prepared as in Example I, however, the batter was placed into an aerosol can, which was subsequently charged with 80 pounds of 85 percent nitrogen dioxide and 15 percent carbon dioxide.

The batter was dispensed and cooked as in Example I to provide a dark brown product which was lighter in texture and more aerated than pancakes made from the same batter but poured from a jar. Microbiological tests employed in Example I were repeated here and the results were substantially the same.

Although the invention has been described with reference to specific examples, it will be obvious to those skilled in the art that various other embodiments can be practiced within the scope of this invention.

We claim:

1. A pancake batter with an Aw between 0.80 to 0.90 and adapted to be packaged in a non-hermetic packaging material without sterilization and stored for long periods of time without refrigeration, said batter having a moisture content effective to allow the batter to be poured to 40 percent by weight and water soluble solids at least equal to the weight of moisture of the batter, edible polyhydric alcohols constituting the principal source of water soluble solids ranging from about 20 percent to 35 percent of the batter, said batter further containing a pancake mix having a major proportion of wheat flour, a minor proportion of corn flour and a leavening agent, milk, sugar, eggs, an edible oil, and an effective level of antimycotic to prevent mold growth.

2. The batter of claim 1 contained in an aerosolized vessel under pressure, said batter containing an edible polyhydric alcohol in amounts ranging from about 24 percent to 33 percent by weight of the batter.

3. The batter of claim 1 which contains an edible polyhydric alcohol in amounts ranging from about 24 percent to 33 percent by weight of the batter, said batter being packaged without sterilization and capable of being stored for long periods of time without refrigeration.

4. A cooked pancake product with an Aw between 0.65 to 0.75 and adapted to be packaged in a non-hermetic packaging material without sterilization and stored for long periods of time without refrigeration, said product having a moisture content of at least 14 percent by weight, said product prepared from a pancake batter having water soluble solids at least equal to the weight of moisture of the batter, edible polyhydric alcohols constituting a principal source of water soluble solids ranging from about 20 percent to 35 percent of the batter, said batter containing a pancake mix having a major proportion of wheat flour, a minor proportion of corn flour and a leavening agent, milk, sugar, egg, an edible oil, and an effective level of antimycotic to prevent mold growth.

* * * * *